United States Patent

[11] 3,547,212

| [72] | Inventors | Gerald M. Grusin<br>400 W. Deming Place, Chicago, Ill. 60614;<br>James E. Logan, 6812 N. Ashland Ave.,<br>Chicago, Ill. 60626 |
|---|---|---|
| [21] | Appl. No. | 864,068 |
| [22] | Filed | Oct. 6, 1969<br>Continuation-in-part of Ser. No. 713,361,<br>Mar. 15, 1968, Pat. No. 3,512,594 |
| [45] | Patented | Dec. 15, 1970 |

[54] BATHROOM SCALE WITH OPTICALLY PROJECTED DIAL INDICATOR
9 Claims, 6 Drawing Figs.

[52] U.S. Cl. .................................................... 177/178, 177/234

[51] Int. Cl. .................................................... G01g 23/32, G01g 23/26

[50] Field of Search .......................................... 177/177, 178, 126, 127, 234, 225

[56] References Cited
UNITED STATES PATENTS

| 1,166,658 | 1/1916 | Buckingham.................. | 177/178X |
| 1,385,718 | 7/1921 | Schaper....................... | 177/178 |
| 3,022,845 | 2/1962 | Provi........................... | 177/234X |
| 3,193,034 | 7/1965 | Hutchinson et al.......... | 177/234 |

*Primary Examiner*—Robert S. Ward, Jr
*Attorney*—Dominik, Knechtel and Godula

ABSTRACT: A bathroom scale having a projected dial indicator system of a construction such that the latter can be installed as a unitary unit.

PATENTED DEC 15 1970

INVENTORS
Gerald M. Grusin
James E. Logan

BY
Dominik, Knechtel & Godula
ATTYS.

PATENTED DEC 15 1970

INVENTORS
Gerald M. Grusin
James E. Logan
BY
Dominik, Knechtel & Godula
ATTYS.

BATHROOM SCALE WITH OPTICALLY PROJECTED DIAL INDICATOR

This invention is a continuation-in-part of copending application, Ser. No. 713,361, filed March 15, 1968, now U.S. Pat. No. 3,512,594 issued May 19, 1970.

This invention relates to an improved bathroom scale having a projected dial system adapted to project an enlarged, illuminated numerical weight indication onto a projection screen.

In the above-mentioned copending application, there is disclosed a bathroom scale which includes a projected dial indicator system that is constructed using, in most cases, standard components that are readily available on the open market. In addition, the system is incorporated into an existing housing and is adapted to function with a known type of weight mechanism, with little modification to them. The dial readout is in the form of numerals, and every pound weight is numerically indicated so that the person using the scale can easily and quickly determine his weight without the necessity of interpreting and/or interpolating a slide rulelike dial of the type presently used. Half-pound weights also can be indicated graphically, if desired. The dial indicia is magnified and projected as large, legible numerals onto a projection screen which, in a preferred disclosed embodiment, is mounted so as to not project above the top surface of the scale's platform. The projection screen therefore does not detract from the aesthetic appeal of the scale and, furthermore, does not present an obstruction over which people can trip or which will interfere with storing the scale.

The projected dial system of the bathroom scale, furthermore, is adapted to be activated by means of a pushbutton switch so that the dial can be readjusted to zero setting, without influencing the operation of the weight mechanism.

Several important improvements are provided by the present invention, to the subject bathroom scale. In particular, a new and improved projection system or assembly is provided, so that the latter can be simply installed as a unitary unit. Assembly, therefore, is greatly simplified and can be accomplished much more rapidly.

A simple solution to the problem of aligning the reflectors so that the reflected numerals are properly located or positioned on the projection screen also is provided. In fact, with the new, improved construction, alignment can be accomplished by adjusting a single threaded screw.

Still another improvement relates to an improved switch assembly or arrangement for energizing the dial projection system.

Accordingly, it is an object of the present invention to provide an improved bathroom scale having a dial projection system.

More particularly, an object is to provide an improved projection system or assembly for such a bathroom scale.

A still further object is to provide an improved projection system or assembly for such a bathroom scale which can be installed therein as a unitary unit.

Still another object is to provide an improved projection system or assembly for such a bathroom scale constructed in a fashion such that alignment of the reflecting surfaces thereof can be easily and quickly accomplished.

Another object is to provide an improved switch assembly or arrangement for energizing the dial projection system of a bathroom scale of the above-described type.

Other objects of the invention will in part be obvious and will in part appear hereinafter.

The invention accordingly comprises an article of manufacture possessing the features, properties and the relation of elements which will be exemplified in the article hereinafter described, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
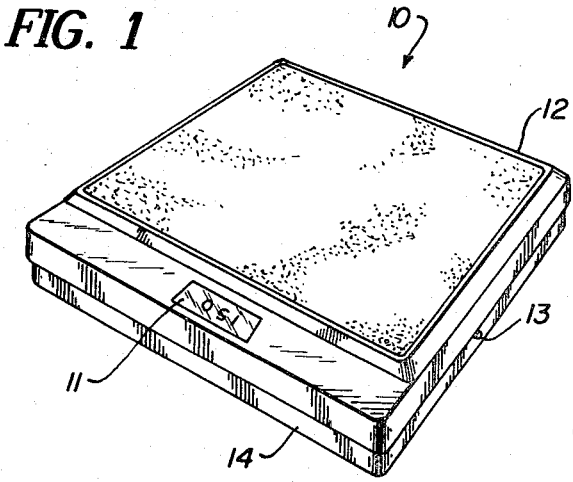
FIG. 1 is a perspective view of a bathroom scale exemplary of the invention.

Referring now to the drawings, in FIG. 1 there is illustrated a bathroom scale 10 of the type disclosed in the above-mentioned copending application, including a projected dial system for projecting an illuminated and enlarged numerical indication of the weight of the party using it, onto a projection screen 11. As indicated in said subject copending application, the scale 10 preferably includes a source of stored power, such as batteries, however, an externally mounted power pack can be used or the scale 10 can be easily modified so that it can be powered from the ordinary 110 volt AC source generally found in the home. The projected dial system is adapted to be activated when a predetermined weight, approximately 10 pounds, is placed on the platform 12 of the scale, and further is adapted to be activated by means of a push button 13 (FIGS. 2 and 6), so that the scale can be readjusted to zero setting, without having to apply weight to the platform 12. The operation of its weighing mechanism therefore is not adversely affected or influenced, when the scale is zeroed. Each pound weight is indicated numerically, by means of large, legible numerals, and half-pound weights can be indicated graphically, if desired, so that the indicated weight can be easily read and determined.

More specifically, the bathroom scale 10 includes a base 14 (FIGS. 2 and 3) and a platform 12 which together form a housing for protectively enclosing the weighing mechanism and the projected dial system thereof. The weighing mechanism is of the generally well-known type disclosed in U.S. Pat. No. 2,228,874, and reference can be made to this patent for a complete description of its construction and operation. Generally however, the weighing mechanism includes an equalizer plate 15 which is supported at each of its opposite ends for movement in a substantially horizontal plane below the platform 12, by means of legs 16 (FIG. 6) depending from a pair of spaced-apart rocker members 17 and 18. A weight spring 19 is affixed to one end of the equalizer plate 15 and to the end of a zero adjustment screw 20. The weight spring 19 resists the movement of the equalizer plate 15, and the 0 adjustment screw 20 permits the scale to be readily and easily adjusted so as to correctly indicate zero, when there is no weight disposed on the platform 12. A gear rack (not shown) is supported on the equalizer plate 15 for longitudinal sliding movement, and is drivingly engaged with a pinion gear (not shown) affixed to the end of a shaft 22. This shaft 22 is rotatably supported in a vertically disposed position, and a dial wheel 25 is affixed to and rotatably driven by it, when the equalizer plate 15 and the gear rack affixed to it, are moved.

The rocker members 17 and 18 are pivotally supported atop wall supports 26 and 27, and the platform 12 seats atop them. When weight is placed on the platform 12, the rocker members 17 and 18 are pivotally operated to, in turn, move the equalizer plate 15 and the gear rack affixed to it. The gear rack, in turn, drivingly engages the pinion gear affixed to the shaft 22, and causes the later and the dial wheel 25 affixed to it to rotate.

The scale's dial 28 is affixed to the dial wheel 25 and comprises a circular-shaped drum having a top wall 29 and an annular sidewall 30. The numerical indicia 32 is provided about the annular sidewall 30, and as indicated in the above-mentioned copending application, can be provided by forming the same on a film strip 31, such as a length of standard 8 mm. film. The film strip 31 is affixed about the annular sidewall 30 in any suitable fashion. The drum preferably is formed of a transparent plastic such as crystal clear polystyrene. The dial 28 is affixed to the dial wheel 25 be extending the shaft 22 and a pair of alignment pins 33 and 34 affixed to the dial wheel 25 through apertures provided in the top wall 29, and by affixing a threaded nut 35 to the shaft 22.

As indicated above, certain improvements have been made in the scale 10, however, it is believed that these improvements will be more apparent after having explained the operation of the scale 10, which is as follows. When weight is applied to the platform 12, for example, when a person stands on it, the rocker members 17 and 18 are caused to pivot. The rocker members 17 and 18, in turn, cause the equalizer plate 15 and the gear rack affixed to it to move. As the gear rack moves, it drivingly engages the pinion gear affixed to the shaft 22 and causes the latter and the dial wheel 25 and the dial 28 affixed to it to rotate. The dial 28 and the film strip 31 affixed to it are oriented in such a manner as to cause the appropriate indicia 32 to be positioned in front of the lamp 40 (FIGS. 2 and 5) so that it will be projected onto the projection screen 11, when the lamp 40 is energized.

Figure 4:
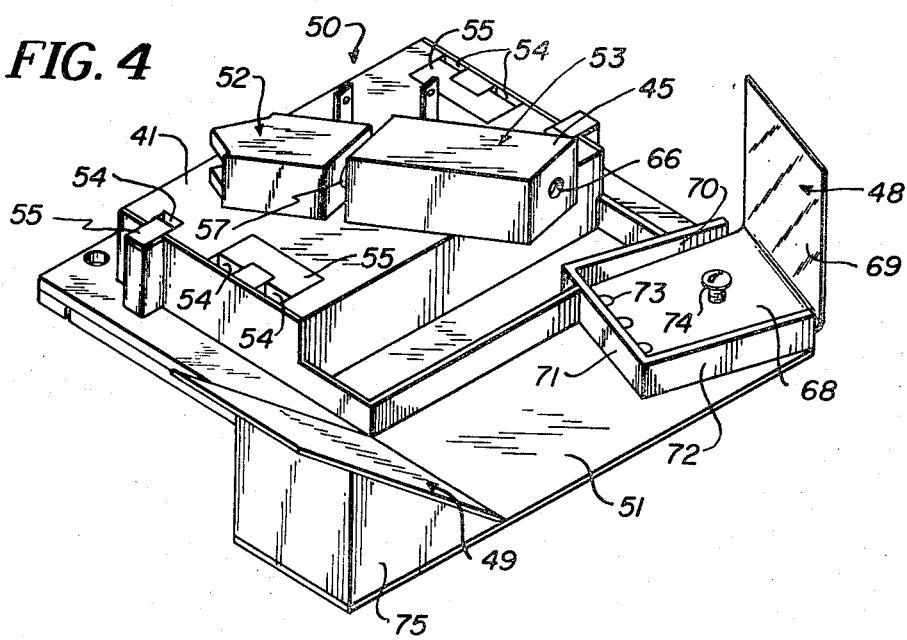
FIG. 4 is a perspective view of the projection system or assembly for the bathroom scale.
Figure 2:
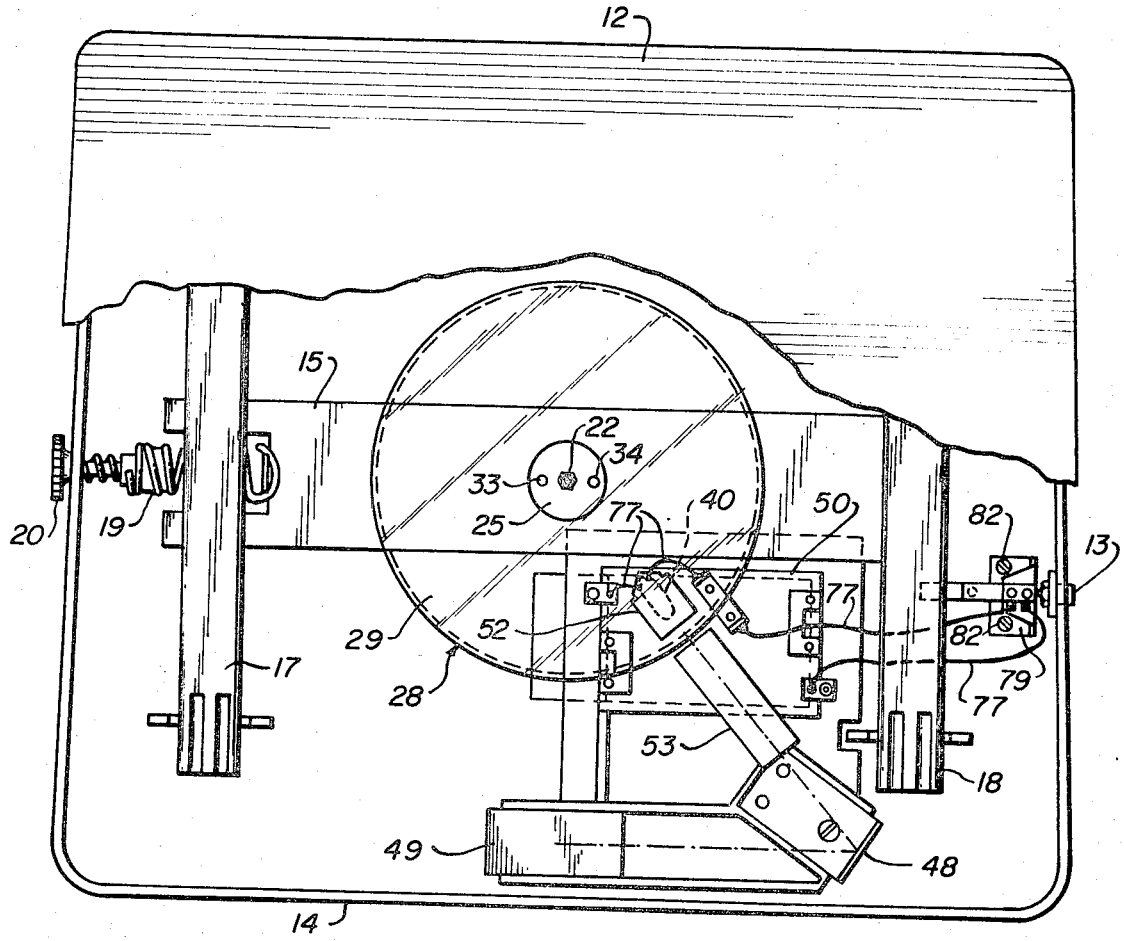
FIG. 2 is an enlarged, top plan view of the bathroom scale of FIG. 1, with a portion of its platform broken away to illustrate its interior construction.
Figure 3:
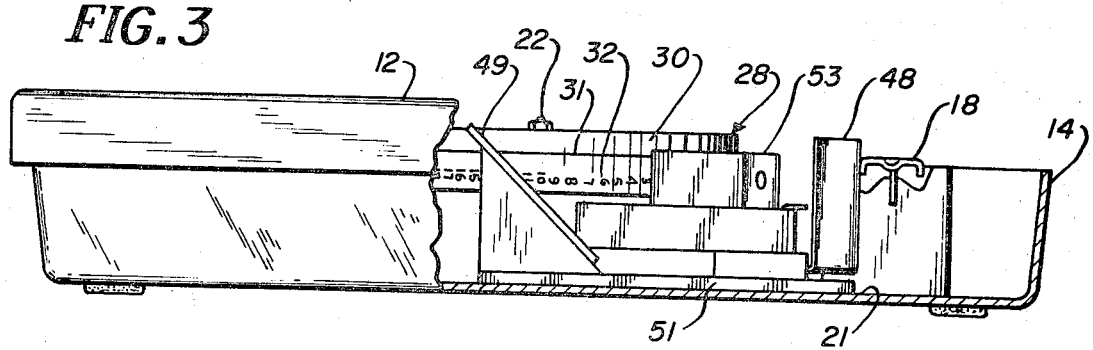
FIG. 3 is a side plan view of the bathroom scale of FIGS. 1 and 2, partially broken away to illustrate its interior construction.

The lamp 40 is energized by means of a source of stored power, that is, batteries, contained within a housing 41 FIGS. 2 and 4), under the control of a switch 42 (FIGS. 2 and 6) having a pair of normally open contacts 43 and 44. As can be best seen in FIG. 6, the contact 44 normally is engaged by the rocker member 18, and the switch 42 is opened so that the lamp 40 is not energized. When weight is applied to the platform 12, the rocker member 18 is caused to pivot counter clockwise, and the contact 44 is thereby allowed to close with contact 43, to energize the lamp 40.

When the lamp 40 is energized, light is impinged on the film strip 31 affixed to the dial 28. The image of the numeral corresponding to the weight on the platform 12 is projected through a pair of lenses 46 and 47 of a magnifying and projection lens system 45 (FIG. 5) which inverts, magnifies and projects it onto a vertically disposed reflector 48 (FIGS. 2 and 4) in a fashion such that the numeral appears inverted and reversed on the latter. From the reflector 48, the numeral is reflected onto another reflector 49. This latter reflector is horizontally disposed and is at an angle of approximately 45° with respect to the vertical plane of the reflector 48 so that the numeral is expanded or stretched, and therefore effectively further magnified, and is projected vertically upwardly onto the rear of the projection screen 11. In the process, the numeral further is rotated and properly oriented so that it is horizontally disposed on the projection screen, as illustrated in FIG. 1.

When the weight is removed from the platform 12, the equalizer plate 15 and the gear rack affixed to it are returned to their initial inoperative positions. The contact 44 is again engaged by the rocker member 18, to open the contacts 43 and 44, to thereby deenergize the lamp 40.

From the above description of the operation of the bathroom scale 10, it will be appreciated that the dial 28, the lamp 40, the lenses 46 and 47, and the reflectors 48 and 49 all must be properly aligned, in order to properly reflect the numerals 32 on the dial 28 onto the projection screen 11. In order to achieve the proper alignment of these elements of the bathroom scales disclosed in the above-mentioned copending application, extremely close manufacturing tolerances must be established and maintained. Furthermore, considerable care must be exercised during the assembly operation, otherwise any errors due to variations to tolerances are magnified and compounded. These undesirable features are substantially, if not completely, eliminated in the bathroom scale of the present invention, by affixing these elements to a unitary molded subassembly 50, in a fashion such that they now can be easily and quickly assembled and aligned.

As can be best seen in FIG. 4, the subassembly 50 has a flat base 51 which is adapted to be affixed flat to the bottom wall 21 (FIG. 3) of the base 14 of the scale. Integrally molded with the base 51 is a generally rectangular-shaped, hollow-housing 41 which both forms an enclosure for the batteries (not shown) for energizing the lamp 40 and supports a lamp enclosure 52 and a lens enclosure 53. The bottom wall 21 of the base 14 has an opening (not shown) in it which is aligned with the housing 41, for inserting the batteries. This opening is closed with a removable cover (not shown). The top wall of the housing 41 has a number of openings 54 in it, through which the depending fingers of metallic contacts 55 can be extended to make electrical contact with the batteries in the housing, and to connect these batteries in series.

Figure 5:
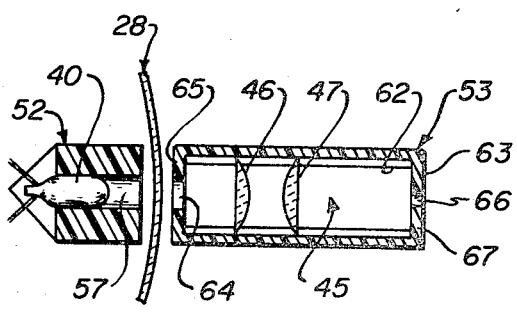
FIG. 5 is a sectional view of the lenses and the light source assembly of the projection system, illustrating the manner in which the dial transverses it.

The lamp enclosure 52, as can be best seen in FIGS. 4 and 5, is integrally molded with the top wall of the housing 41 and is generally rectangular-shaped with a lamp receiving cavity 57 formed therein, for frictionally receiving the lamp 40. This lamp receiving cavity 57 also functions as an aperture for impinging the light from the lamp 40, onto the lenses 46 and 47.

The lens enclosure 53 is a two-piece structure including a generally rectangular-shaped lens support 62 which is integrally molded with the top wall of the housing 41, and a cover or hood 63. The bottom and sidewalls of the lens support 62 are formed with lens receiving grooves (not shown) in them, for receiving and supporting the lenses 46 and 47 in vertically disposed, spaced-apart relationship, as illustrated in FIG. 5. The hood 63 is adapted to be frictionally or otherwise affixed to the lens support 62, to enclose the lenses 46 and 47 and to function as a dust cover for them. In addition, the hood 63 has an opening 64 in its end wall 65 for permitting light to enter the lens enclosure 53, and a smaller opening 66 in its opposite end wall 67 for impinging light onto the reflector 48. The hood 63 therefore also functions as an aperture, for impinging the light from the lamp 40 onto the reflector 48.

The reflector 48 is formed of a rectangular-shaped length of sheet metal which is bent or folded L-shaped so as to form two legs 68 and 69. At least one of these legs, in the illustrated example, the leg 69 is highly polished so that it will reflect the image of the numeral 32 on the dial 28 onto the reflector 49. The other leg 68 is adapted to be affixed to the base 51 of the subassembly 50, within the confines of three walls 70—72 integrally molded with the base 51. The walls 70—72 are located and the dimensions of the leg 68 of the reflector and the spacing between the walls 70—72 are correspondingly sized so that the leg 68 fits snugly between the walls and the latter thereby automatically positioning the reflector 48. The leg 68 is fixedly secured between the walls 70—72 in any suitable fashion, as by means of flatheaded rivets 73. The leg is secured only along its leading edge, and a threaded screw 74 is threadedly extended through an aperture formed substantially centrally therein. This threaded screw 74 functions to angularly raise and lower the leg 68 to adjustably position the other leg 69 to align the reflector 48, as more fully described below.

The other reflector 49 also is formed of a rectangular or square-shaped length of sheet metal which is highly polished. This reflector 49 is affixed to a ramp 75 which is generally in for form of a 45° triangle integrally molded with the base 51 of the sub assembly 50. The reflector 49 is affixed to the 45° surface of the ramp 75, with its side edges aligned with the sidewalls of the ramp and its lower edge abutted against the base 51 of the sub assembly 50.

From the above description of the subassembly 50, it can be seen that the lamp 40, the lenses 46 and 47, and the reflectors 48 and 49 all can be easily and quickly assembled therewith, with little concern about them being properly aligned. This stems form the fact that the lamp enclosure 52, the lens enclosure 53, the walls 70—72 and the ramp 75 which supports these various elements all are integrally molded with the base 51 of the subassembly 50, in fixed, predetermined relationship with one another, and further determine or establish the manner or position in which these elements are disposed with respect to the subassembly and to each other. For example, the lamp 40 is fixedly positioned with respect to the lenses 46 and 47 merely by inserting it into the cavity 57 in the lamp closure 52. The lenses 46 and 47, in turn, are fixedly positioned with respect to one another and further with respect to the lamp 40 and the reflector 48 simply by placing them in the slots in the lens support 62 of the lens enclosure 53. The reflectors 48 and 49 are properly positioned by disposing the leg 68 of the reflector 48 within the confines of the walls 70—72, and by affixing the reflector 49 to the angled surface of the ramp 75.

Once these elements have been assembled with the subassembly 50, the latter is affixed within the base 14 of the scale 10, by means of fasteners such as threaded screws or rivets extended through apertures formed in the base 51 of the subassembly and the base 14 of the scale. These apertures can be preformed in preestablished locations, if desired. The electric conductors 77 (FIG. 2) can be affixed to the contacts 55, either before or after the subassembly 50 is affixed within the base 14, and the electric connections with the switch 42 then completed by affixing the conductors to respective ones of the switch contacts 43 and 44.

Assuming that the weighing mechanism has been affixed within the base 14 of the scale, the dial 28 is assembled by extending the alignment pins 33 and 34 and the end of the shaft 22 through the apertures formed in the dial for receiving them. A threaded nut is then affixed to the end of the shaft 22, to securely affix the dial to the shaft.

It can be seen in FIGS. 2 and 5, that the sidewall 30 of the dial 28 is disposed to extend between the ends of the lamp enclosure 52 and the lens enclosure 53, when the dial is affixed to the shaft 22. Upon completing the assembly of the scale 10, a final alignment adjustment is made to aim the projected image onto the reflector 49, before the platform 12 is affixed to the base 14. This final alignment is easily and quickly made with the desired construction, simply by activating the dial projection system so that an image is projected onto the reflector 48 and then threadedly adjusting the screw 74 until this image is properly reflected and aligned with a target which may be a cardboard fixture of the like forming a screen upon which the image can be projected and observed, temporarily placed flat atop the reflector 49. It is found that this one simple adjustment is generally sufficient to compensate for any variations in tolerance of the various elements, or the assembly thereof, as well as any variations in the tolerance or assembly of the dial 28 including the film strip 31 affixed thereto.

Figure 6:
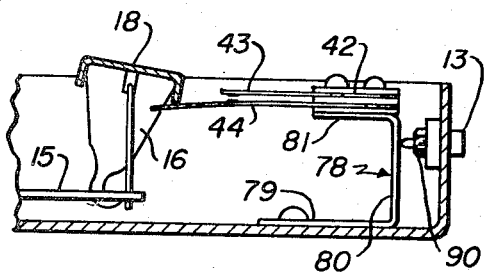
FIG. 6 is a partial sectional view of the bathroom scale, illustrating the construction of the switch for energizing the dial projection system.

As indicated above, an improved switch assembly or arrangement for energizing the dial projection system also has been provided for the scale 10. This new switch assembly, as can be best seen in FIGS. 2 and 6, includes a generally U-shaped switch support 78 having legs 79—81. The switch 42 is affixed to the leg 81 and the leg 79 is fixedly secured to the base 14 of the scale 10, so that the contact 44 of the switch 42 is disposed to be engaged by the rocker member 18 and thereby operated to normally open the contacts 43 and 44 when there is no weight applied to the platform 12 of the scale, as illustrated in FIG. 6. When the rocker member 18 is pivotally operated, in the manner described above, when weight is applied to the platform, these contacts are closed to energize the dial projection system.

To adjust the scale 10 to its zero setting, the pushbutton 13 is pressed so that its end engages and causes the leg 80 to bend or pivot at its lower end. In doing so, the switch 42 is tilted inwardly and angularly downwardly and its contact 44 is disengaged with the rocker member 18, to thereby permit the contacts 43 and 44 to close. These contacts, in closing, energize the dial projection system. The zero adjustment screw 20 is rotated, which action adjustably positions the spring 19 in a fashion such as to adjustably position the equalizer plate 15, until the numeral "0" is viewed on the projection screen 11. The pushbutton 13 then is released to deenergize the dial projection system. An adjustment screw 90 is affixed to the pushbutton 13, and is threadably adjustable to engage the end of the pushbutton 13 with the leg 80, to compensate for any variation in assembly tolerances.

It will thus be seen that the objects set forth above, among those made apparent from the preceding description, are efficiently attained and certain changes may be made in the above article. Accordingly, it is intended that all matter contained in the above description or shown in the accompanying drawings shall be interpreted as illustrative and not in a limiting sense.

We claim:

1. A low-profile, portable bathroom scale comprising, in combination: a base; a movable platform associated with said base for receiving an object to be weighed; a weight mechanism having a rotatable shaft and being responsive to the movement of said platform to rotate said shaft; a dial mounted on said shaft so as to extend substantially horizontally below said platform and having indicia of weight values provided on it; a projection screen mounted on and movable with said platform as the latter is operated; a dial projection system including a source of light, a first and a second reflecting surface and a lens system including at least a pair of lenses, a molded support having a lamp enclosure, a lens enclosure and mounting means for receiving and defining the location and the position in which said first and second reflecting surfaces are fixedly secured to said support all integrally molded therewith, said lamp enclosure and said lens enclosure further being formed to receive and to position said source of light to project an image of said indicia on said dial onto and through said pair of lenses onto said first reflecting surface, said first reflecting surface being positioned to reflect said image onto said second reflecting surface and the latter being positioned to reflect said image on said projection screen, whereby said dial projection system can be preassembled and affixed as a subassembly in said base; and switch means operated responsive to the operation of said weight mechanism for activating said dial projection system.

2. The bathroom scale of claim 1, wherein said molded support further has a hollow battery housing which is opened on its bottom side integrally molded with it, a closable opening in said base aligned with the open bottom of said housing to permit batteries to be inserted through said opening into said housing.

3. The bathroom scale of claim 1, wherein said lamp enclosure comprises a generally rectangular-shaped structure having a substantially centrally disposed lamp receiving aperture extending through it, said source of light being an electric lamp removably inserted within said lamp receiving aperture.

4. The bathroom scale of claim 1, wherein said lens enclosure comprises a generally rectangular-shaped structure having a U-shaped cross section, the interior surface thereof having support means formed therein for receiving and supporting said pair of lenses in vertically-disposed, spaced relation therein.

5. The bathroom scale of claim 4, further including a hood adapted to be frictionally affixed to said lens enclosure to enclose the interior thereof, said hood functioning as a dust cover for said lenses and having an opening in each of its opposite end walls so as to also function as an aperture for said lenses.

6. The bathroom scale of claim 1, wherein said mounting means comprises a plurality of vertically-disposed walls formed to receive said first reflecting surface therebetween so as to locate and position said first reflecting surface, and a generally triangular-shaped structure having an angled surface formed to receive and to position said second reflecting surface.

7. The bathroom scale of claim 1, wherein said first reflecting surface is L-shaped having two legs, one of said legs being vertically disposed and the other of said legs being horizontally disposed and affixed along its forward free end to said support in the location and position defined by said mounting means, a threaded screw threadedly extended through an aperture formed in said horizontally disposed legs with the terminal end thereof engaged with the surface of said support, said threaded screw being threadably adjustable to align said first reflecting surface to reflect said image of said indicia onto said second reflecting surface.

8. The bathroom scale of claim 1, wherein said switch means comprises a U-shaped bracket having three legs, two of which are horizontally disposed, one of said two horizontally disposed legs being affixed to said base of said scale and the other one of them having a switch having a pair of contacts fixedly secured to it, said pair of contacts being disposed so that one of them is engaged by said weight mechanism and is normally operated to open said pair of contacts when there is no weight applied to said platform, said one contact being permitted to operate to close said pair of contacts to activate said dial projection system when weight is applied to said platform.

9. The bathroom scale of claim 8, further including adjustment means for adjusting said weight mechanism to a zero setting, a pushbutton affixed to said base with the terminal end thereof extended through and into said base to engage said third one of said legs of said bracket when said pushbutton is operated, said third leg being pivotally bent and causing said switch to move angularly downwardly to disengage said one contact with said weight mechanism, and to thereby permit said pair of contacts to close to activate said dial projection system without applying weight to said platform.